(12) United States Patent
Suenaga et al.

(10) Patent No.: US 6,519,216 B1
(45) Date of Patent: Feb. 11, 2003

(54) CD SUBCODE TRANSFER SYSTEM FOR TRANSFERRING CORRECT Q SUBCODES

(75) Inventors: Yoshiaki Suenaga, Kyoto (JP); Mitsuki Hamasaki, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/526,663

(22) Filed: Mar. 15, 2000

(30) Foreign Application Priority Data

Mar. 16, 1999 (JP) .......................................... 11-069413

(51) Int. Cl.⁷ .................................................. G11B 7/00
(52) U.S. Cl. ................................ 369/47.18; 369/47.21; 369/59.28
(58) Field of Search ........................... 369/47.18, 47.21, 369/53.32, 53.34, 53.35, 59.23

(56) References Cited

U.S. PATENT DOCUMENTS

| | | | | |
|---|---|---|---|---|
| 5,237,575 A | * | 8/1993 | Maeda et al. ............ | 371/40.01 |
| 5,471,441 A | * | 11/1995 | Nonaka et al. ................ | 369/32 |
| 5,917,782 A | * | 6/1999 | Kim et al. ..................... | 369/32 |
| 5,931,921 A | * | 8/1999 | Kyle ............................ | 710/29 |

\* cited by examiner

*Primary Examiner*—Nabil Hindi
(74) *Attorney, Agent, or Firm*—Hogan & Hartson, LLP

(57) ABSTRACT

A CD subcode transfer system includes a means for receiving a CD signal and outputting, along with a subcode, digital data derived from the CD signal after the digital data is error corrected and demodulated. The CD subcode transfer system also includes a means for determining whether a CRC check bit for Q channel data of the subcode is correct and for determining whether the Q channel data is correct upon comparison of the Q channel data with preceding Q channel data. In addition, the CD subcode transfer system includes a means for transferring the subcode and attaching the subcode to the digital data when the CRC check bit is determined to be correct and the Q channel data is determined to be correct.

20 Claims, 6 Drawing Sheets

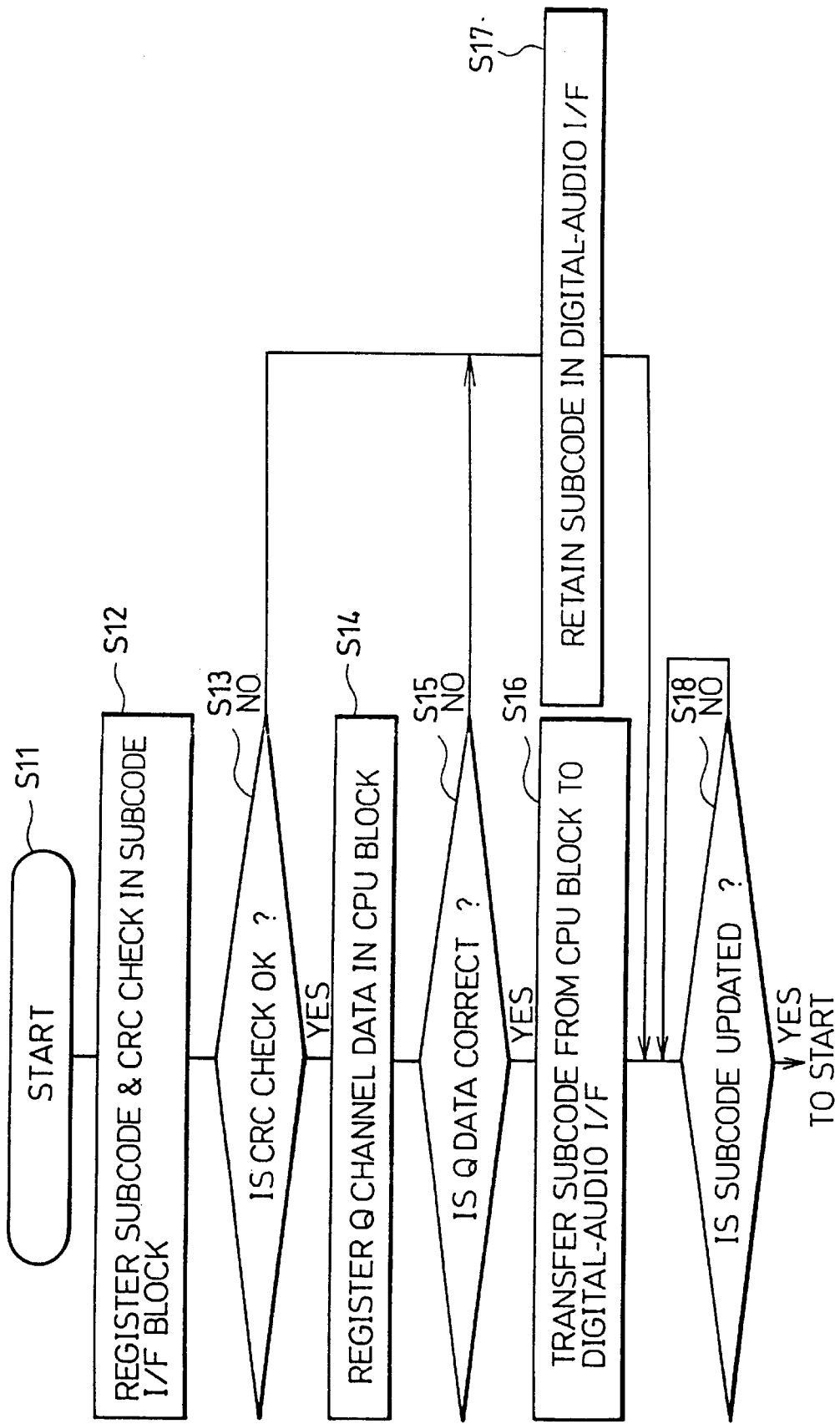

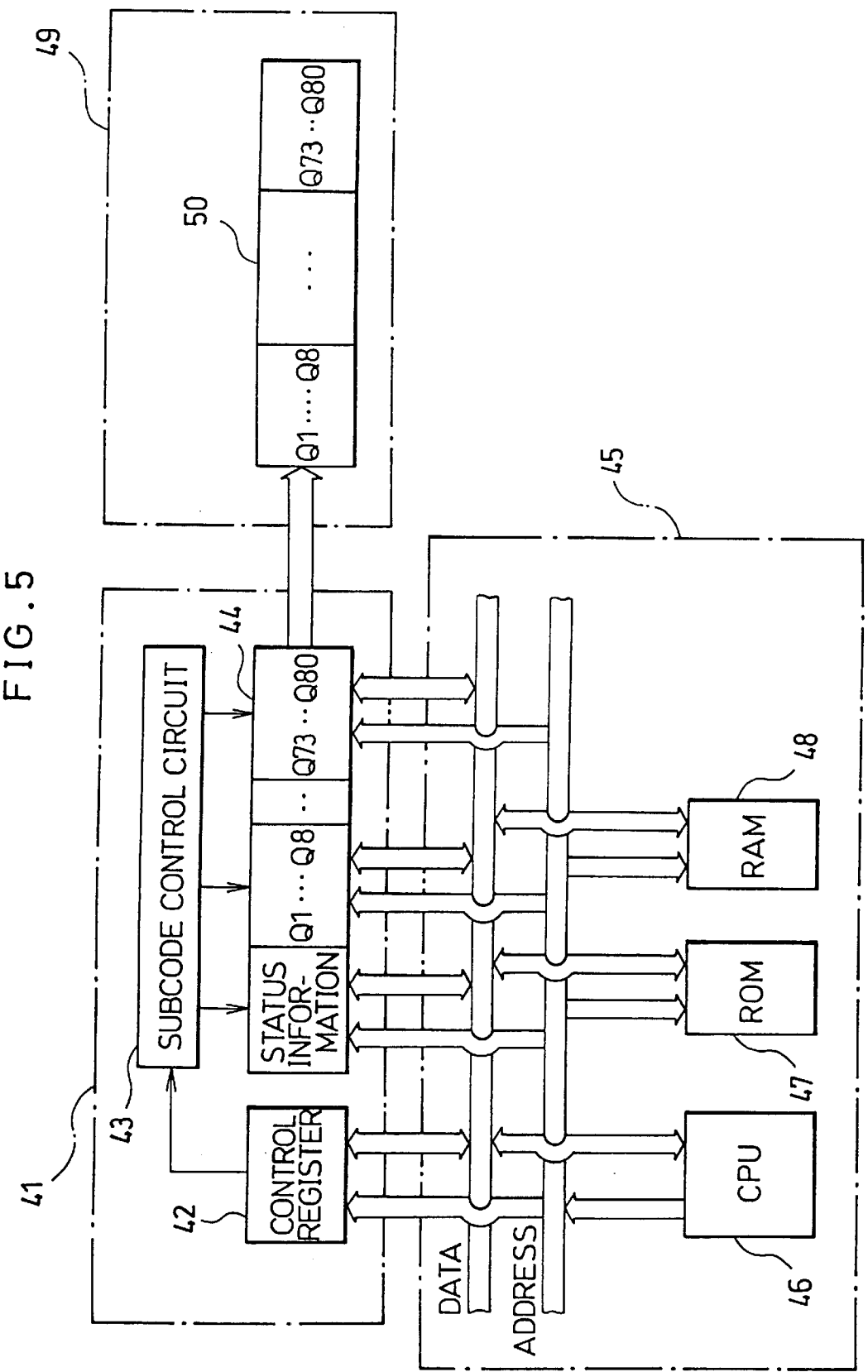

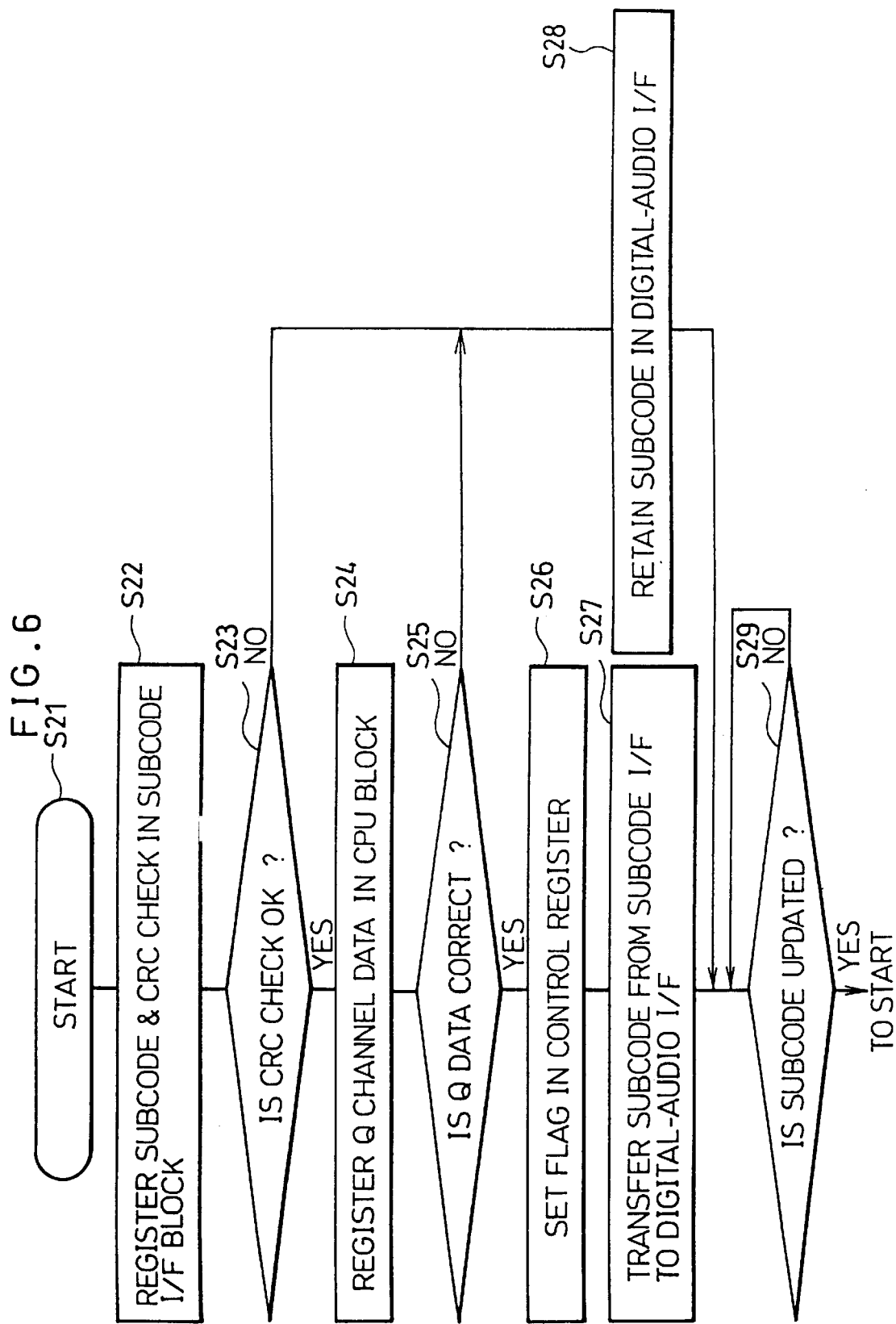

CD SUBCODE TRANSFER SYSTEM FOR TRANSFERRING CORRECT Q SUBCODES

FIELD OF THE INVENTION

The invention relates to a system (referred to as subcode transfer system) for transferring correct subcodes of a compact disk (CD) to a digital audio interface (I/F) for outputting retrieved digital CD signals.

BACKGROUND OF THE INVENTION

CD signals contain a set of 8 bit symbols called subcoding symbols, one set for each data frame in addition to synchronization signals and digital audio signals.

A block of 98 such data frames constitutes a unified frame, which is a unit for subcoding CD signals.

Included in the subcoding symbols are 8 bit symbols P, Q, R, S, T, U, V, and W. Symbols P and Q are used to search for a starting bit of a melody and an execution of a programmed operation. Symbols R through W are provided for such special functions as displaying still pictures and Kara-Oke characters on a screen.

The data retrieved from a CD is mostly demodulated and converted to analog audio signals for analog audio devices, but the demodulated signals may be output also in the digital form for use with a digital device such as an MD. For better use of the digital signals, it is necessary to attach to the digital signals appropriate subcodes.

As an example, Q channel data may be utilized in processing different requests such as a request to replay a movement of a melody as instructed by a program, and a request to display elapsed time in the movement or absolute time.

FIG. 1 shows a major portion of a conventional subcode transfer system, in which demodulated digital audio signals of a CD are output to an MD together with subcodes attached thereto to make better use of the digital signals.

As shown in FIG. 1, the system includes a subcode I/F block 61 which consists of a subcode buffer 62, a register 63, and a control circuit 64. First, a subcode is extracted from a given block of CD data, which subcode is stored in the subcode buffer 62. At the same time, a cyclic redundancy code (CRC) check bit included in the Q channel data of the subcode is checked to determine if the Q channel data as a whole is correct or not. The result of the CRC check is registered in the register 63 as status information of the Q channel data. This status information in the register 63 is supplied to the control circuit 64, and if the Q channel data stored in the subcode buffer 62 is correct, the subcode is transferred from the subcode I/F block 61 to the digital audio I/F block 65 through the control circuit 64.

The subcode transferred from the subcode I/F block 61 to the digital audio I/F block 65 is stored in a subcode buffer 66. The subcode is then attached to the digital audio signal (not shown) as the digital audio signal is output to an external device such as MD.

In conventional CD subcode transfer systems, the subcode is transferred unless the CRC check bit is determined to be incorrect. That is, the subcode is transferred based solely on the CRC check. However, since the CRC check coding is a rather simple error detection coding, its error can be overlooked, especially in cases where many errors are involved in the data retrieved from a CD.

Consequently, it is often the case that an erroneous subcode is determined to be correct. In that case, the erroneous subcode will be transferred. That means that if the time information is in error for example, it cannot be regenerated after it is copied on an MD for example, or, if it is regenerated, it causes an error displaying erroneous time or processing the data at wrong time.

It is therefore an object of the invention to provide an improved subcode transfer system in which only correct subcodes of a CD are transferred by checking not only their CRC check bits but also the subcodes themselves. The latter check can be made by noting the characteristics of the subcodes.

SUMMARY OF THE INVENTION

In one aspect of the invention, there is provided a CD subcode transfer system, including:

means for receiving a CD signal and outputting, along with a subcode, digital data derived from the CD signal after the digital data is error corrected and demodulated;

means for determining whether a CRC check bit for Q channel data of the subcode is correct and for determining whether the Q channel data is correct upon comparison of the Q channel data with preceding Q channel data; and means for transferring the subcode and attaching the subcode to the digital data when the CRC check bit is determined to be correct and the Q channel data is determined to be correct.

In another aspect of the invention, there is provided a CD subcode transfer system, including:

CD signal processing means for receiving a CD signal and outputting, along with a subcode, digital data derived from the CD signal, error corrected, and demodulated;

a subcode I/F block for holding a current subcode contained in the CD signal supplied from the CD signal processing means and for holding a CRC check bit for Q channel data in a current subcode as status information;

a CPU block for retrieving at least current Q channel data and status information in the form of the CRC check bit, determining whether the CRC check bit is correct, and comparing the Q channel data with the preceding Q channel data to thereby determine whether the Q channel data is correct;

a digital I/F block for receiving the digital data and the subcode and for outputting the digital data with the subcode attached thereto, wherein
the subcode to be attached to the digital data is supplied to the digital I/F block only when both of the CRC check bit and the current Q channel data are determined to be correct.

A CD subcode transfer system of the invention may be adapted to supply the subcode to be attached to the digital data provided from the CD signal processing means, from the CPU block to the digital I/F block.

Alternatively, a CD subcode transfer system of the invention may be adapted to supply the subcode to be attached to the digital data provided from the CD signal processing means, from the subcode I/F block holding the subcode to the digital I/F block directly in response to a transfer instruction received from the CPU block.

In another aspect of the invention, there is provided a CD subcode transfer system, including:

a CD signal processor for receiving a CD signal and outputting, along with a subcode, digital data derived from the CD signal after the digital data is error corrected and demodulated;

a CPU block for determining whether a CRC check bit for Q channel data of the subcode is correct and for determining whether the Q channel data is correct upon comparison of the Q channel data with preceding Q channel data; and a digital audio I/F block for receiving the subcode and attaching the subcode to the digital data when the CRC check bit is determined to be correct and the Q channel data is determined to be correct.

Since the CD subcode is transferred on condition that said CRC check bit and the Q channel data are both correct, the CD subcode transfer system stops the transfer of the subcode to the digital I/F block, even if the subcode has many errors and an incorrect determination is made that the CRC check bit is correct. Thus, the invention may stop the erroneous display of data due to incorrect subcodes and always provides only correct subcodes.

Since the subcode retrieved in the CPU is transferred from the CPU block to the digital I/F block, no further means is required.

It would be appreciated that the entire subcode may be directly transferred from the subcode I/F block to the digital I/F block based on a data transfer instruction issued by the CPU, thereby allowing a fast subcode transfer.

BRIEF DESCRIPTION OF THE DRAWINGS

The invention will be described in detail by way of example with reference to the accompanying drawings, in which:

FIG. 4 is a flowchart representation of a first procedure for the CD subcode transfer performed in the first CD transfer system;

FIG. 5 is a main portion of a second CD subcode transfer system according to the invention; and FIG. 6 is a flowchart representation of a second procedure for the CD subcode transfer performed in the second CD transfer system.

DETAILED DESCRIPTION OF THE PREFERRED EMBODIMENT

Figure 1:
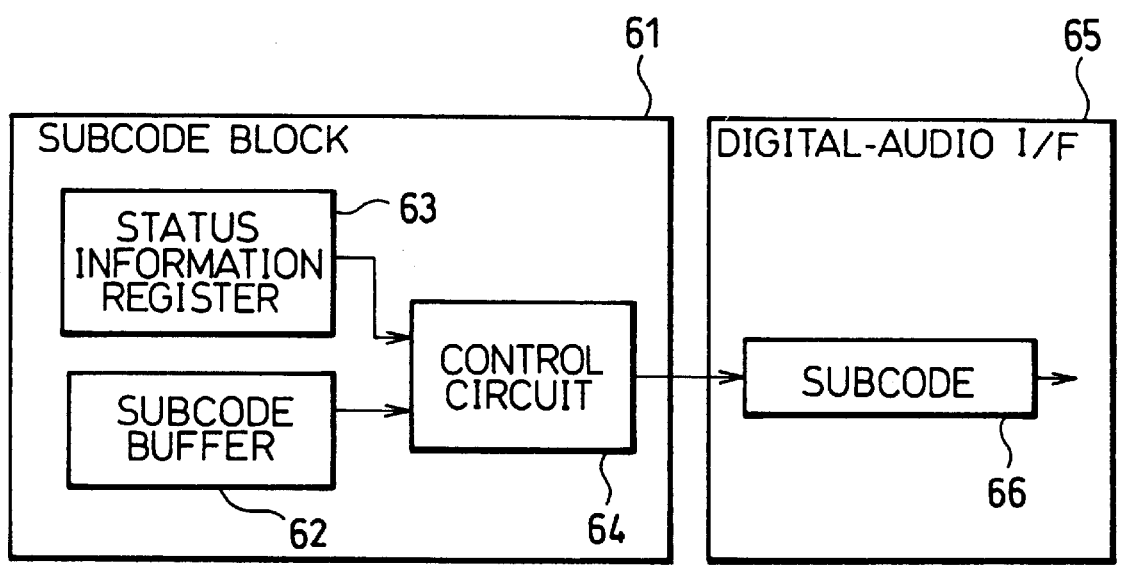
FIG. 1 is a main portion of a conventional subcode transfer system.
Figure 2:
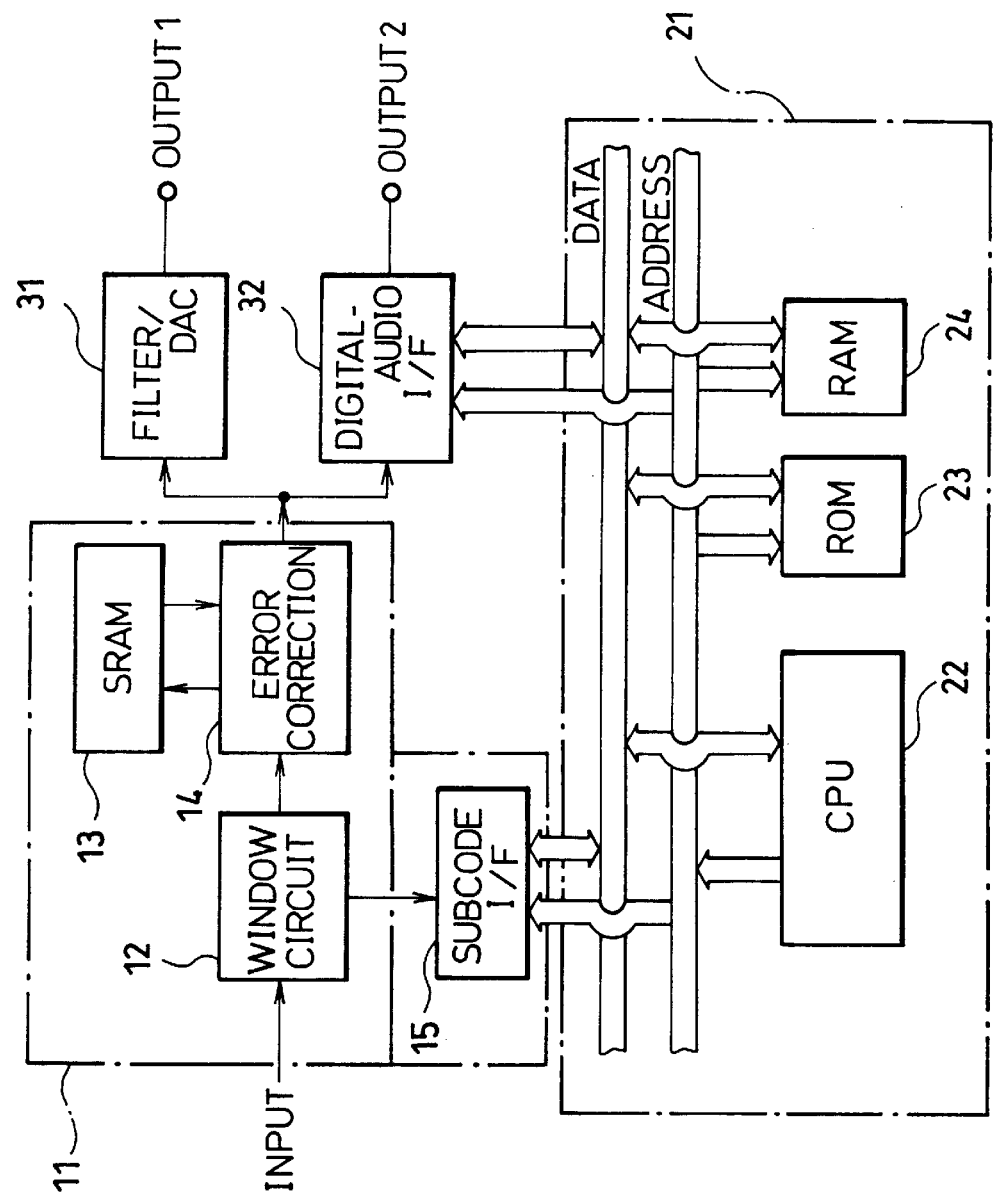
FIG. 2 is a block diagram representation of a first CD subcode transfer system according to the invention, showing an overall structure thereof.

Referring now to FIG. 2, there is shown an exemplary CD signal processing means 11 of the invention, which includes such typical components as a window circuit 12, a static RAM 13, and an error correction circuit 14. The window circuit 12 receives a CD signal at its input end of the CD signal processing means 11 and supplies the audio signal of the CD to the error correction circuit 14 and the subcode of the signal to a subcode I/F block 15. The error correction circuit 14 utilizes the static RAM 13 as a work memory in decoding the audio signal which has been encoded with an error correction code defined for a CD data system, generally known as Cross Interleaved Reed-Solomon Code (CIRC). The decoded digital audio signal is output as a regenerated audio signal.

The digital audio signal is supplied on one hand from the CD signal processing means 11 to a filter/DA converter 31, where the signal is digitally filtered. The signal is then converted to an analog signal before it is output therefrom as output 1, as shown in FIG. 2. On the other hand, the digital audio signal is supplied from the CD signal processing means 11 to a digital audio I/F block 32. In the digital audio I/F block 32, the subcode for the audio signal, which subcode is supplied separately to the digital audio I/F block 32, is attached to the audio signal before the signal is output as an output 2 to an external digital device such as an MD.

Figure 3:
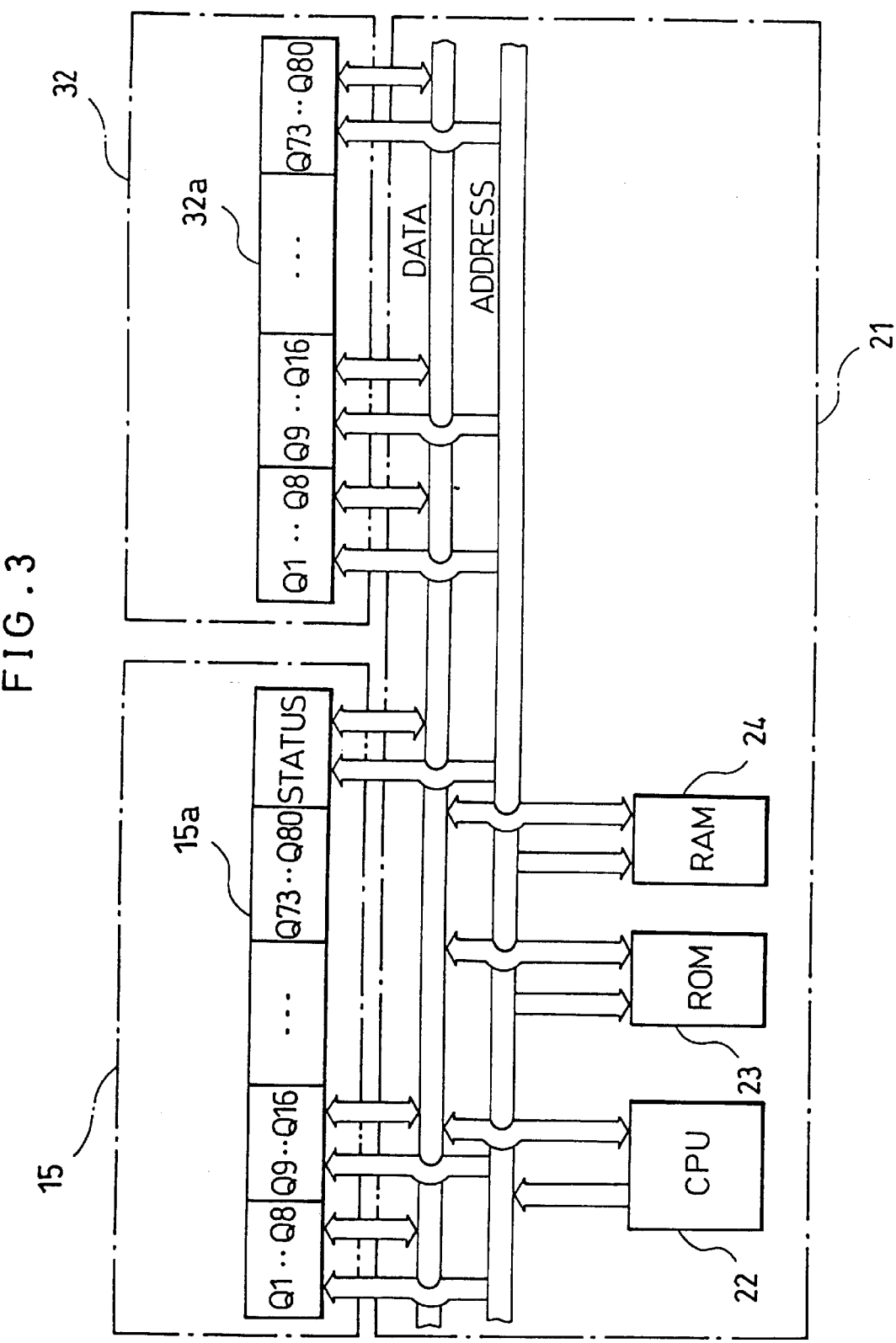
FIG. 3 is a main portion of the first CD subcode transfer system.

The subcode I/F block 15 receives the subcode and the CRC check bit of the Q channel data as the status information therefor from the window circuit 12, and store them in the registers of the subcode I/F block 15. FIG. 3 shows details of the register, Q channel data register 15a, of the subcode I/F block 15. The Q channel data register 15a holds the Q channel data, which data includes a movement number TNO, index X, elapsed time in the movement in MIN, SEC and frame number FRAME, and absolute time in MIN, SEC and frame number FRAME, along with the status information in the form of CRC check bit representing the result of the CRC check of the Q channel data.

A CPU block 21 consists of a CPU 22, ROM 23 and RAM 24, a data bus DATA, and an address bus ADDRESS. The CPU 22 retrieves the current status information from the Q channel data register 15a for determination of the CRC check bit. The CPU 22 also retrieves from the register 15a the portion of the subcode starting from Q1 through Q80 of the Q channel data, which data is compared with the preceding Q channel data Q1–Q80 that exists in the RAM 24. The transfer of the subcode comprising Q channel data Q1 through Q80 and held in the digital audio I/F block depends on these determination and the comparison.

The digital audio I/F block 32 attaches the subcode supplied from the CPU block 21 to the digital audio signal supplied from the CD signal processing means 11 before the signal is output as the output 2. If the Q channel register 32a is not supplied with a new subcode including Q channel data Q1–Q80 from the CPU block 21, the Q channel data register 32a uses the preceding subcode held therein.

It should be noted that these components are integrated on one chip in a well organized manner.

Referring now to a flowchart shown in FIG. 4, a signal processing procedure performed in the first CD subcode transfer system will be described below.

In the CD signal processing means 11, the CD signal input thereto is first processed by the window circuit 12 such that the audio signal of the CD signal is supplied to the error correction circuit 14, while the subcode and the CRC check bit are supplied to the subcode I/F block 15.

In the error correction circuit 14, the audio signal is decoded in an ordinary CD signal processing procedure, and EFM demodulated before it is output therefrom.

The digital audio signal is supplied from the CD signal processing means 11 to the filter/DA converter 31 on one hand for digital filtering of the signal and converted into analog form before it is delivered as the output 1. On the other hand, the audio signal is also supplied to the digital audio I/F block 32, where the subcode is attached to the audio signal before the signal is output as the output 2.

The subcode I/F block 15 receives the subcode and the CRC check bit of the Q channel data as the status information therefor from the window circuit 12, and store them in the registers of the subcode I/F block 15 (Step S12). The Q channel data and the status information are held in the Q channel data register 15a.

The CPU 22 retrieves the status information for the Q channel data, from the Q channel data register 15a to determine whether or not the status information is correct (Step S13).

If it is determined in Step S13 that the status information is correct, the procedure proceeds to Step S14, where the subcode for the Q channel data stored in the subcode I/F block 15 is retrieved into the CPU block 21 (Step S14).

The retrieved new Q channel data is compared with the Q channel data of the preceding subcode which is stored in the RAM 24 to determine whether the new Q channel data has an error (Step S15).

As described previously, the Q channel data includes a movement number TNO, an index X, elapsed time in the movement in MIN, SEC and frame number FRAME, and absolute time in MIN, SEC and frame number FRAME. The count of data is updated in the course of processing the data so that the subcodes associated with the data are maintained in a sequential order. Thus, by checking the ordered subcodes, it is possible to determined if the new Q channel data has an error.

If it is determined in Step S15 that the new Q channel data has no error, the new subcode held in the subcode I/F block 15 is stored in the RAM 24, and at the same time, transferred to the digital audio I/F block 32 (Step S16). The digital audio I/F block 32 holds the newly delivered subcode in place of the previous subcode, and attaches the subcode to the digital audio data before it is output as the output 2.

However, if it is determined in Step S13 that the CRC check bit is incorrect, and/or in Step S15 that the new Q channel data has some error, the new subcode is not transferred to the digital audio I/F block 32. In this case, the digital audio I/F block 32 keeps on holding the previous subcode (Step S17), attaches the subcode to the digital audio data, and outputs the data as output 2.

Finally, subsequent to Step S16 or Step S17, the procedure checks if the subcode in the subcode I/F block 15 is updated, and if so, repeats the steps as described above (Step S18).

The criteria for the transfer of the subcode to the digital audio I/F block 32 are based on the CRC check and Q channel data determination as summarized in the following table.

| CRC Check | Q data determination | Subcode Transfer |
| --- | --- | --- |
| Correct | Correct | Execute transfer |
| Correct | Incorrect | Prohibit transfer |
| Incorrect | Correct | Prohibit transfer |
| Incorrect | Incorrect | Prohibit transfer |

In the first example herein described above, the subcode of a Q channel data is not transferred to the digital audio I/F block 32 if the CRC check bit alone is correct. It is transferred only when both the CRC check bit is correct and the Q channel data is correct in the comparison with the preceding Q channel data. Therefore, if many errors exist in the subcode and hence they result in an erroneous determination that the CRC check bit is "correct" although the CRC check is actually "incorrect", transfer of the subcode is restrained if the Q channel data itself is found to be incorrect in the determination thereof. Hence, until a new subcode is transferred to the digital audio I/F block 32, the preceding correct subcodes is held therein, thereby always enabling attaching a correct subcode to the digital audio signal that is output from the CD signal processor.

It is noted that the subcode retrieved in the CPU block 21 is transferred therefrom to the digital audio I/F block 32 without any additional component, so that the subcode transfer system is simple in structure.

Referring now to FIGS. 5 and 6, a second example of CD subcode transfer system of the invention will be described. These figures show respectively a detailed structure of a relevant part of the system and a flowchart of a procedure of transferring subcodes according to the invention.

As shown in FIG. 5, a subcode I/F block 41 receives a subcode of a Q channel data and a CRC check bit as the status information on the Q channel data, and stores them in a register, in the same manner as the subcode I/F block 15 shown in FIGS. 2 and 3. In addition, the subcode I/F block 41 is provided with a control register 42 which includes a transfer start bit or transfer start flag for initiating the transfer of the subcode upon receipt of an instruction received from the CPU block 45.

The register 44 is electrically connected to a register 50 of a digital audio I/F block 49 so that the subcode is directly transferred from the subcode I/F block 41 to the digital audio I/F block 49 upon receipt of the instruction from the CPU block 45. It should be understood that the Q channel data register 44 and the Q channel data register 50 shown in FIG. 5 are examples of registers used for the Q channel data of a subcode.

The CPU block 45 is basically of the same structure as the CPU block 21 shown in FIGS. 2 and 3, but is configured to perform extra functions, as described below. In the CPU block 45, the CPU 46 retrieves the status information from the Q channel data register 44 for determination thereof; retrieves from the Q channel data register 44 the Q channel data Q1–Q80 that follows the status information; compares the retrieved Q channel data Q1–Q80 with the preceding Q channel data stored in the RAM 48; and set a transfer start flag if the Q channel data is determined to be correct in the comparison.

The digital audio I/F block 49 attaches the subcode to the digital audio signal supplied thereto and outputs the audio signal as output 2 to a digital device such as MD. To do this, the digital audio I/F block 49 has registers, including the Q channel data register 50 for holding the Q channel data Q1–Q80, so that the subcode can be directly supplied from the registers of the subcode I/F block 41 without passing through the CPU block 45. If a new subcode, including a Q channel data Q1–Q80, is not transferred from the subcode I/F block 41, the preceding subcode held in the digital audio I/F 49 is used. The rest of the subcode transfer system are the same as those in the first example shown in FIG. 2.

Referring now to FIG. 6, steps taken by the subcode transfer system will be described. Those steps which are identical with the corresponding ones in the first example will be omitted for simplicity.

The subcode I/F block 41 receives a subcode and the CRC check bit associated with it as status information for the Q channel data of the code, and stores them in the register 44 (Step S22). Particularly, the Q channel data and the CRC check bit (status information) for the Q channel data are held in the Q channel data register 44.

The CPU 46 retrieves the CRC check bit held in the Q channel data register 44 to determine whether or not the status information is correct (Step S23).

If the CRC check bit is found to be correct in Step S23, the procedure proceeds to Step 24, where only the Q channel data held in the Q channel data register 44 is retrieved into the CPU block 45 (Step S24).

The CPU 46 compares the new Q channel data, i.e. the retrieved Q channel data with the Q channel data which is previously held in the RAM 48 to determine whether the retrieved Q channel data has no error (Step S25).

If the new Q channel data is determined to have no error in Step S25, the CPU 46 issues a flagging signal to the control register 42 to set a flag in the control register 42, i.e. to enable the transfer start bit of the control register 42 (step S26). The previous Q channel data in the RAM 48 is then overwritten by the new Q channel data belonging to the new subcode.

As the transfer start flag is set in the control register 42, the subcode control circuit 43 instructs not only the Q channel data register 44 holding the Q channel data but also the rest of the registers holding P, R . . . W channel data, to transfer the respective data. As a result of this instruction, each channel data held in the registers of the subcode I/F block 41 is transferred to the respective registers of the digital audio I/F block 49 (Step S27).

The digital audio I/F block 49 replaces the subcode held therein by the transferred subcode, attach the transferred subcode to the digital audio data before it is output from the digital I/F block 49.

In the example shown herein above, the subcodes are serially transferred from each register of the subcode I/F block 41 to the corresponding register of the digital audio I/F block 49. It would be clear for a person skilled in art that the subcode can be transferred faster if it is transferred in a parallel data transfer mode, which can be easily attained in the subcode transfer system of the invention, since the components of the system are integrated on a chip.

If it is determined in Step S23 that the CRC check bit is erroneous, and/or that the new Q channel data has some error in Step S25, the new subcode is not transferred to the digital audio I/F block 49. In this case, the digital audio I/F block 49 keeps the previous subcode held therein, attaches the previous subcode to the digital audio data, and outputs the data as Output 2 (Step S28).

Finally, subsequent to Step S27 or Step S28, the procedure checks if the subcode in the subcode I/F block 41 has been updated. If so, the procedure will repeat the steps as described above (Step S29).

As would be understood from the description above, the manners in which the CRC check bit and Q channel data are checked and the conditions under which the subcode is transferred to the digital audio I/F block 32 in the second example are the same as in the first example.

Yet the second example shown and described above provides the similar advantages. In addition, the second example allows a faster subcode transfer because only a necessary portion of Q channel data is retrieved in the CPU block 45 in making an error determination of the Q channel data. In addition, the entire subcode can be directly transferred from the subcode I/F block 41 to the digital audio I/F block 49, which also contributes to decrease the burden of the CPU.

The invention has been described for the case where not only the Q channel data but also the rest of the subcode, i.e. P, R, . . . . W channel data, are transferred to the digital audio I/F block 32 via the CPU block 21 (first example), and where the Q channel data as well as the rest of the subcode (P, R, . . . W channel data) are transferred directly from the subcodes I/F block 41 to the digital audio I/F block 49 (second example).

While the present invention has been particularly shown and described with reference to preferred embodiments thereof it will be understood by those skilled in the art that various changes in form and detail may be made therein without departing from the spirit, scope, and teaching of the invention. For example, in the first example, the Q channel data retrieved in the CPU block 21 for an error determination of the Q channel data, may be transferred to the digital audio I/F block 32 via the CPU block 21, while the remaining P, R, . . . , W channel data may be directly transferred from the subcode I/F block 15 to the digital audio I/F block 32. Alternatively, instead of transferring the entire subcode to the digital audio I/F block, the system can be configured to transfer only a particular channel of the subcode.

What we claim is:

1. A CD subcode transfer system, comprising:
   means for receiving a CD signal and outputting, along with a subcode, digital data derived from the CD signal after the digital data is error corrected and demodulated;
   means for determining whether a CRC check bit for Q channel data of the subcode is correct and for determining whether the Q channel data is correct upon comparison of the Q channel data with preceding Q channel data; and
   means for transferring the subcode and attaching the subcode to the digital data when the CRC check bit is determined to be correct and the Q channel data is determined to be correct.

2. A CD subcode transfer system, comprising:
   CD signal processing means for receiving a CD signal and outputting, along with a subcode, digital data derived from the CD signal, error corrected, and demodulated;
   a subcode I/F block for holding a current subcode contained in the CD signal supplied from the CD signal processing means and for holding a CRC check bit for Q channel data in a current subcode as status information;
   a CPU block for retrieving at least current Q channel data and status information in the form of the CRC check bit, determining whether the CRC check bit is correct, and comparing the Q channel data with the preceding Q channel data to thereby determine whether the Q channel data is correct; and
   a digital I/F block for receiving the digital data and the subcode and for outputting the digital data with the subcode attached thereto, wherein
      the subcode to be attached to the digital data is supplied to the digital I/F block only when both of the CRC check bit and the current Q channel data are determined to be correct.

3. The CD subcode transfer system according to claim 2, adapted to supply the subcode to be attached to the digital data provided from the CD signal processing means, from the CPU block to the digital I/F block.

4. The CD subcode transfer system according to claim 2, adapted to supply the subcode to be attached to the digital data provided from the CD signal processing means, from the subcode I/F block holding the subcode to the digital I/F block directly in response to a transfer instruction received from the CPU block.

5. A CD subcode transfer system, comprising:
   a CD signal processor for receiving a CD signal and outputting, along with a subcode, digital data derived from the CD signal after the digital data is error corrected and demodulated;
   a CPU block for determining whether a CRC check bit for Q channel data of the subcode is correct and for determining whether the Q channel data is correct upon comparison of the Q channel data with preceding Q channel data; and a digital audio I/F block for receiving the subcode and attaching the subcode to the digital data when the CRC check bit is determined to be correct and the Q channel data is determined to be correct.

6. The CD subcode transfer system according to claim 5, further comprising a digital filter for digital filtering the digital data from the CD signal processor.

7. The CD subcode transfer system according to claim 5, further comprising a digital-to-analog converter for converting the digital data before it is output from the digital audio I/F block.

8. The CD subcode transfer system according to claim 5, wherein the CPU block comprises a CPU, ROM, RAM, a data bus DATA, and an address bus ADDRESS.

9. The CD subcode transfer system according to claim 5, wherein the subcode is not transferred to the digital audio I/F block if the CPU block determines that the CRC check bit is incorrect or that the Q channel data is incorrect.

10. The CD subcode transfer system according to claim 5, wherein the CD signal processor, the CPU block, and the digital audio I/F block are integrated on one chip.

11. The CD subcode transfer system according to claim 5, wherein the CD signal processor includes a window circuit, a static RAM, and an error correction circuit.

12. The CD subcode transfer system according to claim 11, wherein the window circuit receives the CD signal and supplies the digital data to the error correction circuit and the subcode of the signal to a subcode I/F block.

13. The CD subcode transfer system according to claim 12, wherein the subcode I/F block receives the subcode and the CRC check bit from the window circuit, and stores them in registers of the subcode I/F block.

14. The CD subcode transfer system according to claim 12, wherein the subcode I/F block further comprises a control register, wherein if the Q channel data is determined to be correct, the CPU block sets a flag in the control register that enables the transfer of the subcode to the digital audio I/F block upon receipt of an instruction received from the CPU block.

15. The CD subcode transfer system according to claim 12, wherein the subcodes are serially transferred from the subcode I/F block to the digital audio I/F block.

16. The CD subcode transfer system according to claim 12, wherein the Q channel data retrieved in the CPU block for an error determination of the Q channel data, may be transferred to the digital audio I/F block via the CPU block, while the subcode is directly transferred from the subcode I/F block to the digital audio I/F block without passing through the CPU block.

17. The CD subcode transfer system according to claim 12, wherein instead of transferring the entire subcode from the subcode I/F block to the digital audio I/F block, only a channel of the subcode is transferred from the subcode I/F block to the digital audio I/F block.

18. The CD subcode transfer system according to claim 12, wherein the subcode I/F block further comprises a subcode control circuit for instructing the transfer of the subcode from the subcode I/F block to the digital audio I/F block.

19. The CD subcode transfer system according to claim 18, wherein the subcode is directly transferred from the subcode I/F block to the digital audio I/F block without passing through the CPU block upon receipt of an instruction from the CPU block.

20. The CD subcode transfer system according to claim 11, wherein the error correction circuit utilizes the static RAM when decoding the CD signal which has been encoded with an error correction code.

* * * * *